(12) United States Patent
Cassell

(10) Patent No.: US 11,035,417 B2
(45) Date of Patent: *Jun. 15, 2021

(54) BOOT ASSEMBLY FOR A JOINT MEMBER

(71) Applicant: GKN Driveline North America, Inc., Auburn Hills, MI (US)

(72) Inventor: Robert L. Cassell, Castelo Branco (PT)

(73) Assignee: GKN Driveline North America, Inc., Auburn Hills, MI (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/438,595

(22) Filed: Jun. 12, 2019

(65) Prior Publication Data

US 2019/0331172 A1    Oct. 31, 2019

Related U.S. Application Data

(62) Division of application No. 15/964,116, filed on Apr. 27, 2018, now Pat. No. 10,378,593.

(51) Int. Cl.
| | |
|---|---|
| *F16D 3/84* | (2006.01) |
| *F16J 15/50* | (2006.01) |
| *F16D 3/223* | (2011.01) |
| *F16J 3/04* | (2006.01) |

(52) U.S. Cl.
CPC .......... *F16D 3/845* (2013.01); *F16D 3/223* (2013.01); *F16J 15/50* (2013.01); *F16D 2003/22316* (2013.01); *F16J 3/042* (2013.01); *Y10S 464/906* (2013.01); *Y10T 403/606* (2015.01); *Y10T 403/62* (2015.01)

(58) Field of Classification Search
CPC ............ F16D 3/845; F16D 3/223; F16D 2003/22316; F16J 15/50; F16J 3/042; Y10T 403/606; Y10T 403/62; Y10S 464/906

USPC .......................... 464/173–175; 277/637, 643
See application file for complete search history.

(56) References Cited

U.S. PATENT DOCUMENTS

| | | | |
|---|---|---|---|
| 9,732,854 B2 * | 8/2017 | Cordes | ..................... F16J 15/02 |
| 2006/0063597 A1 | 3/2006 | Cermak et al. | |

FOREIGN PATENT DOCUMENTS

| | | |
|---|---|---|
| EP | 0540424 A1 | 5/1993 |
| JP | 2001304285 A | 10/2001 |
| JP | 3707623 B2 | 10/2005 |

OTHER PUBLICATIONS

European Extended Search Report for Application No. 19169360.5 dated Sep. 13, 2019 (7 pages).

* cited by examiner

*Primary Examiner* — Greg Binda
(74) *Attorney, Agent, or Firm* — Jennifer M. Brumbaugh; Reising Ethington P.C.

(57) ABSTRACT

A boot assembly for a joint includes a boot and a boot can coupled to the boot at a connecting portion. The boot can includes a mounting portion including a flange having an inner surface and a retainer. The retainer is connected to the flange at a first location and is separate from the flange at a second location spaced from the first location. The retainer includes an inward portion spaced from the first location, and the inward portion is arranged closer to the axis than is the inner surface of the retainer between the first location and a midpoint of the retainer. The inner surface of the retainer is not at a constant angle relative to the axis along the length of the retainer.

13 Claims, 4 Drawing Sheets

BOOT ASSEMBLY FOR A JOINT MEMBER

REFERENCE TO CO-PENDING APPLICATION

This application is a divisional of U.S. patent application Ser. No. 15/964,116 filed on Apr. 27, 2018 now U.S. Pat. 10,378,593 issued Aug. 13, 2019. The entire content of this priority application is incorporated herein by reference in its entirety.

TECHNICAL FIELD

The present disclosure relates generally to a boot assembly, such as for a constant velocity joint.

BACKGROUND

Constant velocity joints (CV joints) are often employed where transmission of a constant velocity rotary motion is desired or required. CV joints are typically greased or otherwise lubricated for the life of the component. The joints are preferably sealed to retain the lubricant inside the joint while keeping contaminants and foreign matter, such as water and dirt, out of the joint. A boot, which may be made of rubber, thermoplastic, silicone material, or the like, usually encloses portions of the CV joints. The boot provides a flexible barrier to retain the grease in the joint and extend the life of the joint.

SUMMARY

In at least some implementations, a boot assembly for a joint includes a boot made from a flexible material and a boot can. The boot can may include a connecting portion at which the boot and boot can are coupled together, a mounting portion including a flange having a central axis and an inner surface that faces the axis and which extends circumferentially and axially relative to the axis, and a retainer. The retainer is connected to the flange at a first location and is separate from the flange at a second location spaced from the first location so that at least a portion of the retainer is movable relative to the flange. The retainer has a length between the first location and second location and the retainer has an inner surface facing the axis, and the retainer further includes an inward portion spaced from the first location. The inward portion is arranged closer to the axis than is the inner surface of the retainer between the first location and a midpoint between the first location and the second location, and the inner surface of the retainer is not at a constant angle relative to the axis along the length of the retainer.

In at least some implementations, the inner surface of the retainer, between the first location and a midpoint between the first location and second location, is not more than 1 mm closer to the axis than a radially innermost portion of the inner surface of the flange separate from the retainer. The inner surface of the retainer, between the first location and a midpoint between the first location and second location, may be at an angle relative to the axis that does not vary by more than 10 degrees. In at least some implementations, the inner surface of the retainer from the midpoint to the first location is parallel to the axis or within 5 degrees of parallel to the axis. The inward portion may be arranged at an angle to the axis of at least 20 degrees.

In at least some implementations, the inward portion includes a free end of the retainer that is not connected to and is movable relative to the flange, and the free end may be bent relative to the remainder of the retainer at an angle of at least 20 degrees. The retainer may be coupled to the flange at a base and have a free end that is not connected to and is movable relative to the flange, and is spaced from the base, and the free end may be closer to the axis than is any other portion of the retainer.

In at least some implementations, an assembly for a joint includes a joint member having a body with a central axis and an annular mounting surface defined by a portion of a radially outer surface of the body, the mounting surface including a radially inwardly extending void open to the outer surface, and a boot assembly coupled to the joint member. The boot assembly has a boot made from a flexible material and a boot can having a body that includes a connecting portion at which the boot and boot can are coupled together, and a mounting portion received over the mounting surface to couple the boot assembly to the joint member. The mounting portion includes a retainer that is connected to the remainder of the boot can at a first location and is separate from the remainder of the boot can at a second location spaced from the first location, and the retainer is flexible and resilient so that at least a portion of the retainer is movable relative to the remainder of the boot can between an unflexed state and a flexed state. The retainer has a bend spaced from the first location that defines an inward portion of the retainer that, in the unflexed state of the retainer, is located radially closer to the axis than the remainder of the retainer and closer to the axis than at least a portion of the mounting surface. When the mounting portion is received over the mounting surface, the inward portion engages the joint member and the retainer is flexed outwardly to the flexed state wherein the inward portion engages the mounting surface, and when the inward portion is aligned with the void the inward portion may resiliently return toward its unflexed position so that the inward portion is received in the void with part of the inward portion closer to the axis than the mounting surface outboard of the void. Then, removal of the boot assembly from the joint is inhibited by engagement of the retainer with the joint member body.

In at least some implementations, the second location includes a free end of the retainer and wherein the inward portion is closer to the free end than the first location. The void may be a circumferentially extending groove, and the boot may include multiple retainers that are circumferentially spaced apart and each arranged for receipt of an inward portion of each retainer in the groove. In at least some implementations, multiple retainers are provided spaced apart about the flange and the mounting surface includes more than one inwardly extending void and the inwardly extending voids are not continuous with each other, are circumferentially spaced around the outer surface, and arranged for receipt of an inward portion of at least one of the retainers.

In at least some implementations, the inner surface of the retainer, between the first location and a midpoint between the first location and second location, is not more than 1 mm closer to the axis than a radially innermost portion of the inner surface of the flange. The inner surface of the retainer, between the first location and a midpoint between the first location and second location, may be at an angle relative to the axis that does not vary by more than 10 degrees. The inner surface of the retainer from the midpoint to the first location may be parallel to the axis or within 5 degrees of parallel to the axis.

In at least some implementations, the inward portion is defined in a free end of the retainer that is movable relative to the flange and the free end is bent relative to the remainder of the retainer at an angle of at least 20°. The inner surface of the retainer is not at a constant angle relative to the axis along the length of the retainer.

In at least some implementations, a constant velocity joint includes an outer race, an inner race, multiple balls positioned between the inner race and outer race to transmit torque between the inner race and outer race, a boot and a boot can. The outer race has a central axis, an axial end and an outer surface including a radially inwardly extending void open to the outer surface and spaced from the axial end. The boot can is coupled to the boot and to the outer race, and has a mounting portion received over the axial end of the outer race. The mounting portion includes an inner surface that faces the axis and extends axially relative to the axis from an axial end of the boot can and the mounting portion includes a retainer. The retainer has a base that is connected to the boot can within the mounting portion and the retainer having a movable end that is spaced from the base and not connected to the boot can. The retainer is flexible about the base relative to the flange so that the retainer can flex between an unflexed state and a flexed state. And the retainer has a bend spaced from the base that defines an inward portion of the retainer that, in the unflexed state of the retainer, is located radially closer to the axis than the remainder of the retainer and closer to the axis than a portion of the outer surface of the outer race. At least a portion of the retainer is received within the void with the inward portion closer to the axis than at least a portion of the outer surface of the outer race and removal of the boot assembly from the joint is inhibited by engagement of the retainer with the outer race.

In at least some implementations, the inner surface of the retainer is not at a constant angle relative to the axis along the length of the retainer. The inward portion may be located closer to the movable end than the base. And at least a portion of the retainer is radially overlapped by the outer race once the retainer is received within the void.

Various features and components may be combined together except where they are mutually exclusive, in accordance with the description below, which is intended to illustrate the various features rather than limit the inventions described herein.

BRIEF DESCRIPTION OF THE DRAWINGS

The following detailed description of preferred implementations and best mode will be set forth with regard to the accompanying drawings, in which.

DETAILED DESCRIPTION

Figure 1:
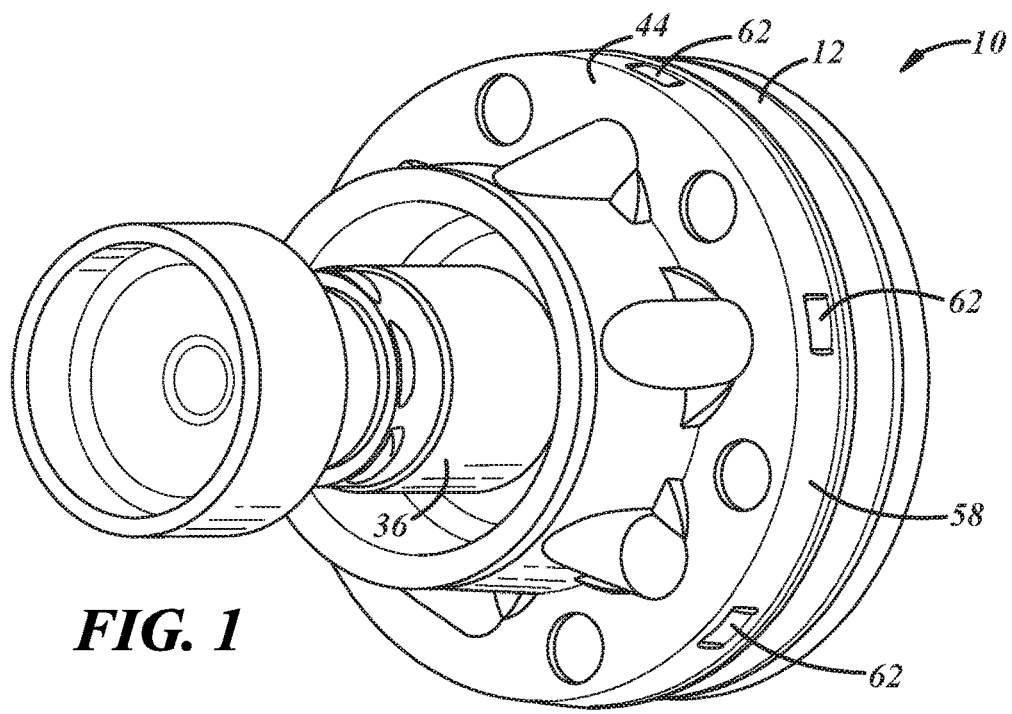
FIG. 1 is a perspective view of a CV joint with a boot of a boot assembly removed.
Figure 2:
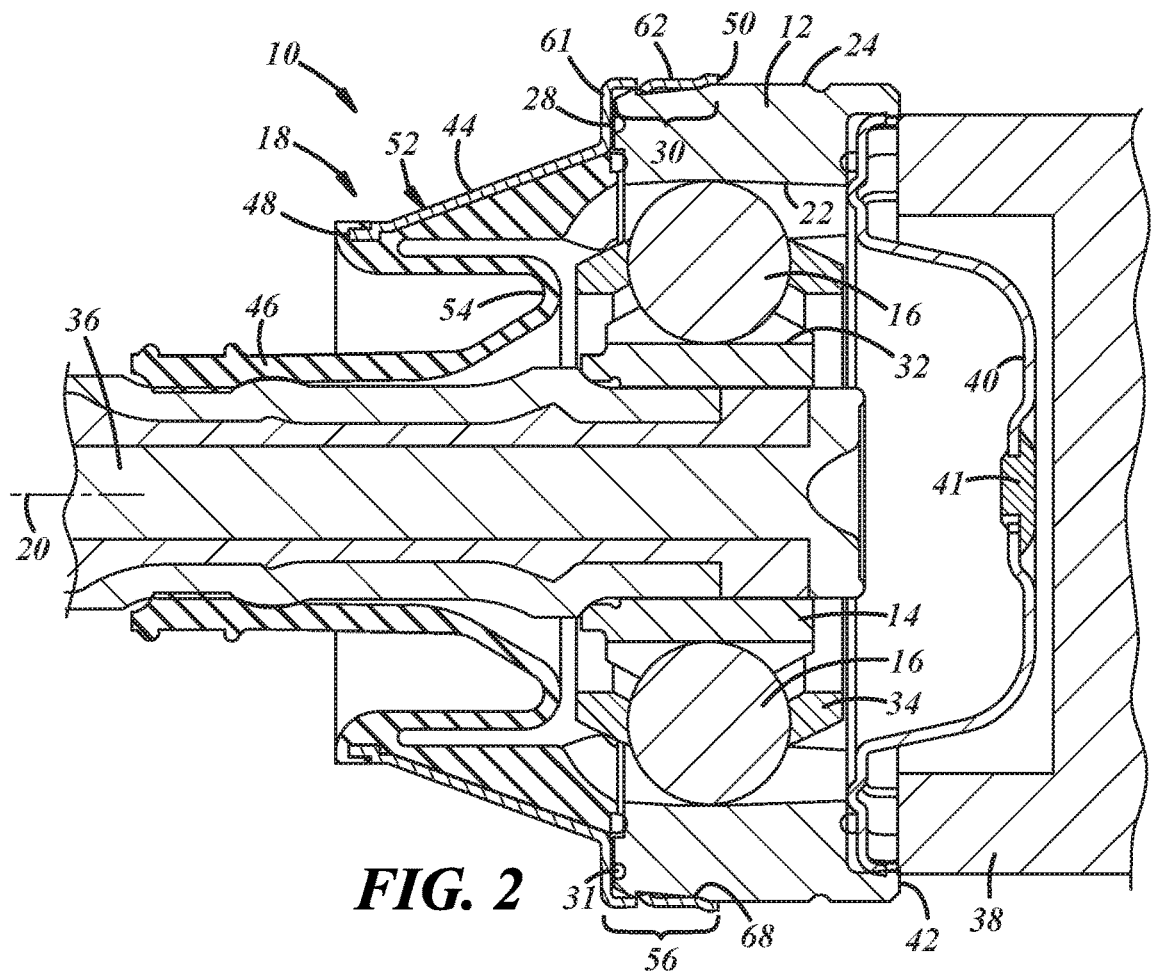
FIG. 2 is a cross sectional view of the CV joint including the boot assembly.
Figure 3:
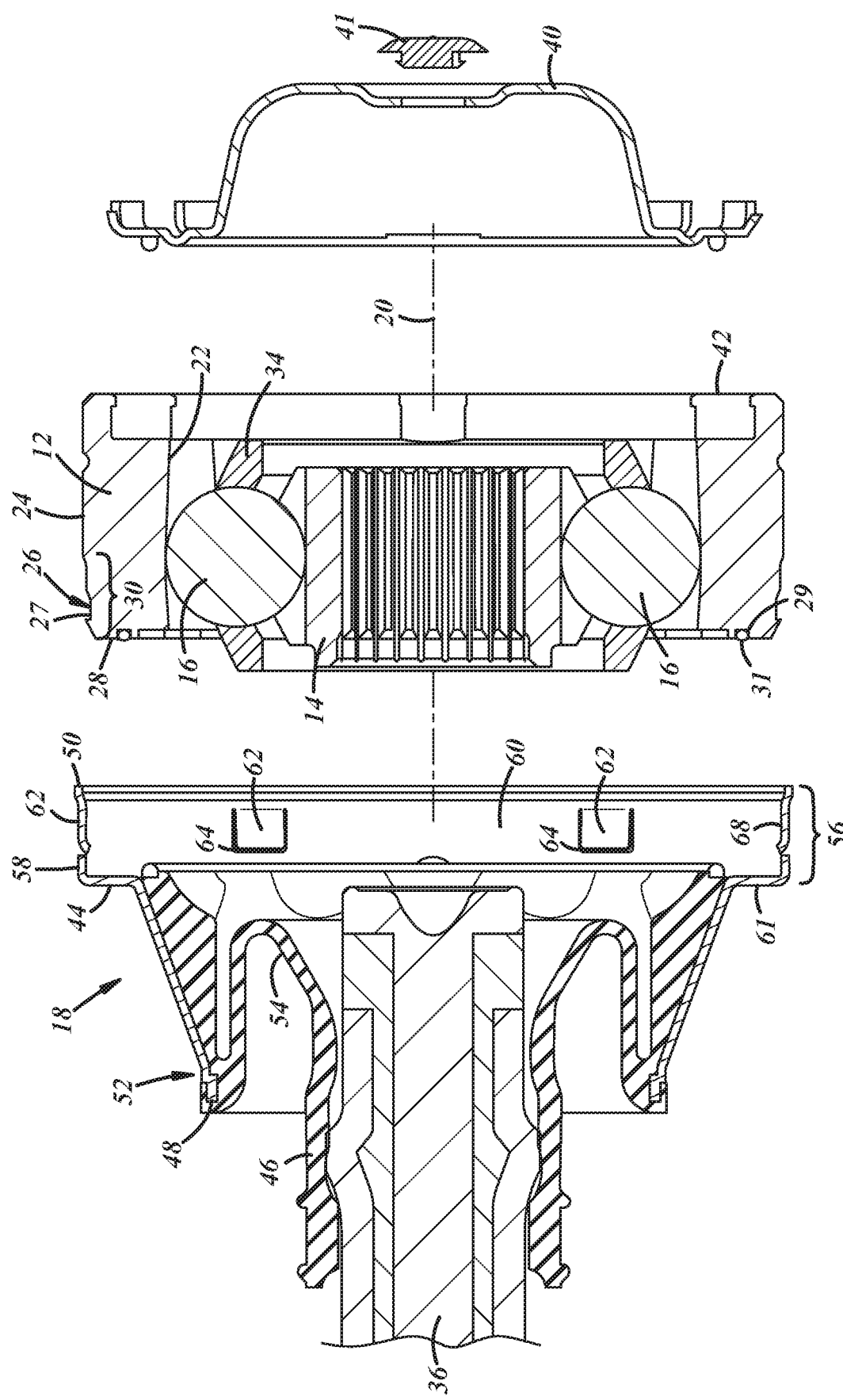
FIG. 3 is an exploded sectional view of the CV joint.

Referring in more detail to the drawings, FIGS. 1-3 illustrate a constant velocity (CV) joint 10 that allows for transmission of constant velocities at angles typically encountered in every day driving of automotive vehicles. The CV joint 10 may be used, for example, with half shafts, interconnecting shafts and propeller shafts of these vehicles, or otherwise as desired. The CV joint 10 may have an outer race 12 and an inner race 14 pivotally coupled to one another and arranged to define multiple ball tracks for carrying a plurality of torque transmitting member, like rollers or balls 16 so that the inner race and outer race co-rotate. The CV joint 10 may be any type of constant velocity joint, such as a tripod, double offset, cross-groove, Rzeppa, and the like. And as set forth herein, a boot assembly 18 may be coupled to the CV joint.

The outer race 12 has a central axis 20 about which the outer race rotates, and an inner surface 22 with multiple outer ball tracks defined in the inner surface. To facilitate coupling the boot assembly 18 to the outer race 12, the outer race may include in an outer surface 24 a radially inwardly extending void 26 open to the outer surface and axially spaced from a first axial end 28 of the outer race 12. As shown in FIG. 3, the outer race 12 may contain an axially inwardly extending gland or groove 29 open to the first axial end 28 and radially spaced from the central axis 20, and a gasket or seal 31, such as an o-ring may be received within the groove 29. A mounting surface 30 to which the boot assembly 18 is mounted is defined between the axial end 28 and at least the void 26. The mounting surface 30 may be annular and extend circumferentially around the outer race 12. In one embodiment this void 26 may be a continuous groove or channel that extends around the circumference of the outer race 12, although the void 26 may include multiple discrete voids spaced circumferentially around the outer surface 24 of the outer race 12, if desired. The void(s) 26 include a radially inner surface 27 that is closer to the axis 20 (e.g. has a smaller diameter) than is the outer surface 24 of the outer race 12. The outer race 12 is generally made of metal, such as steel, however, any other type of metal material, plastic, or composite material, etc., may also be used for the outer race in at least some implementations.

The inner race 14 may be received at least partially within (e.g. axially overlapped by) the outer race 12 and may have an outer surface 32 in which multiple inner ball tracks are defined. The inner ball tracks in the inner race 14 are aligned with the outer ball tracks in the outer race 12 and the balls 16 are positioned between the inner race and outer race with each ball received within a respective one of the outer ball tracks and inner ball tracks. The inner race 14 may be made of steel, however, any other metal composite, hard plastic, etc., may also be used.

To help retain the balls 16 between the outer race 12 and inner race 14, a cage 34 with openings in which the balls are located is received between the outer and inner race. The cage 34 may be annular, at least partially axially overlapped by the outer race 12 and the inner race 14 (i.e. radially between the races), and may be made of a steel material but other metal materials, plastics, composites, etc. may also be used.

In at least some implementations, a first shaft or rotary component 36 (FIGS. 1-3) is coupled to the inner race 14 and a second shaft or rotary component 38 (FIG. 2) is coupled to the outer race. The balls 16 permit pivoting of the inner race relative to the outer race and thus, pivoting of the first rotary component 36 relative to the second rotary component 38 while the rotary components rotate together, at the same rotational velocity.

On or at a second axial end 42 of the CV joint 10, a grease cap 40 may be fitted to the outer race 12 for retaining grease or other suitable lubricant within the CV joint 10 and inhibiting contaminants from entering the joint. Grease cap 40 may also contain a venting mechanism 41, represented in FIGS. 2-3 as a vent valve, that allows for high pressure gas to be expelled during joint operation. Opposite to the grease cap 40, the boot assembly 18 may enclose at least part of the CV joint 10 to retain grease within the joint and inhibit entry of contaminants into the joint.

In at least some implementations, the boot assembly 18 includes a boot can 44 and a flexible boot 46. The boot can 44 may be annular, have a central axis (which may be coaxial with the outer race) and first and second axially spaced ends 48, 50. The boot can 44 may be formed of a substantially rigid material, such as but not limited to, aluminum, steel, carbon fiber and composite. The flexible boot 46 may be constructed of a flexible material, such as, but not limited to, rubber based products, plastics, urethane, silicones, elastomers, silicone, thermoplastic elastomer (TPE), and any other flexible composite materials. It is understood however, that boot 46 may comprise any other suitable material that is sufficiently flexible to allow the CV joint 10 to operate through a wide range of angles.

The flexible boot 46 and the boot can 44 are coupled together at a connecting portion 52 of the boot can 44 which may include the first axial end 48 of the boot can and may be located radially outwardly spaced from the first rotary component 36 to provide clearance between the rotary component, the boot can and at least a portion of the boot. In assembly of the CV joint 10, the boot 46 may be coupled to the first rotary component 36 (e.g. by a connector, like a clamp or band) at a location spaced from the connecting portion 52, and may include a pleat or bellows 54 between the portion of the boot coupled to the first rotary component and the portion of the boot coupled to the boot can 44 at the connecting portion. In this way, the boot 46 may accommodate pivoting of the first rotary component 36 relative to the boot can 44.

The boot can 44 may be coupled to the outer race 12 opposite the grease cap 40. In this regard, the boot can 44 may have a body with a mounting portion 56 that may include a flange 58 extending to the second axial end 50 of the boot can. The flange 58 may be circumferentially continuous and may have an inner surface 60 that faces the axis 20 and extends circumferentially and axially relative to the axis. The inner surface 60 of the flange 58 may be sized and arranged to be received over a portion of the outer surface 24 of the outer race 12. Between the connecting portion 52 and the mounting portion 56, the boot can 44 may include an intermediate portion 61 (FIGS. 2 and 3) which may extend at a non-zero angle relative to the axis 20, and is shown as being perpendicular to the axis 20 and overlying at least part of the first axial end 28 of the outer race 12. The intermediate portion 61 may engage and seal against the axial end 28 and/or the seal 31 in the axial end. Instead of the seal being carried by the outer race, the seal could be carried by (e.g. molded onto or coupled to) the boot can in the intermediate portion 61.

To facilitate coupling the boot can 44 to the outer race 12, the flange 58 or other portion of the boot can 44 may include at least one retainer 62. Alternate embodiments are possible that do not require a flange 58 or that the retainers 62 be on a flange. In at least some implementations, the retainer 62 is connected to the flange 58 at at least one first location 63 and separate from the flange 58 at at least one second location 65 spaced from the first location so that a portion of the retainer 62 is movable or bendable relative to the flange 58. In at least some implementations, this may be accomplished by the retainer 62 being cantilevered to the boot can 44, as depicted in FIG. 3, with a void 64 surrounding a portion of the retainer and defining a free end 66 that may move relative to the flange 58 and a base (e.g. the first location 63) fixed to the flange and defining a living hinge about which the retainer may bend or flex relative to the flange. However, other variations are possible. For example, by way of a non-limiting example, it is possible to have sides or other portions of the retainer 62 partially connected to the flange 58 by a coupler which may include a portion of the boot can 44 itself or another material or component. In at least some implementations, a plurality of retainers 62 are carried by (e.g. coupled to) the flange 58 and are circumferentially spaced apart about the flange. In at least some implementations, the first location 63 is closer to the second axial end 50 of the boot can 44 than is the second location 65, and hence, the free end 66 is farther from the axial end 50 than is the base 63 of the retainer 62. The flange 58 and retainer 62 may or may not be continuous with one another and may or may not be made of the same material. The flange 58 may be made of the same material as the rest of the can 44 or may be made of another suitable material. The retainer(s) 62 may be made of an at least somewhat flexible and resilient material to permit the retainers to be flexed during installation of the boot can 44 and to return to or toward their unflexed position or state in an assembled position, as set forth in more detail below.

As shown in FIGS. 4-7, the retainer 62 has an inner surface 68 that faces the axis 20. This inner surface 68 of the retainer 62 is not at a constant angle relative to the axis 20 along the axial length of the retainer 62. That is, the inner surface 68 is not linear along the axial length of the retainer 62. In at least some implementations, the retainer 62 includes an inward portion 70 that extends radially inwardly toward the axis 20 at a different angle than a portion of the retainer 62 between the inward portion 70 and the first location or base 63. The inward portion 70 may be defined by or include a transition or bend 72 at which the angle of the retainer 62 relative to the axis 20 changes. At least part of the inward portion 70 defines a radially innermost portion of the retainer 62. That is, part of the inward portion 70 is closer to the axis 20 than is the remainder of the retainer and/or the inner surface 60 of the flange 58. In implementations including multiple retainers 62, the inward portion 70 of the multiple retainers may collectively define a smallest inner diameter or dimension of the flange 58. The inner diameter or dimension defined by the inward portions 70 of the retainers 62 may be less than an outer diameter of at least a portion of the outer race 12 between the axial end of the outer race 12 and the void 26 in the outer race.

The inward portion 70 or bend 72 can be located at various points along the length of the retainer 62 between the first location 63 and the second location 65. In at least some implementations, the bend 72 is spaced from the base 63 of the retainer and is within a portion of the retainer 62 between the base 63 and the free end 66. The bend 72 and/or inward portion 70 may be closer to the free end 66 than the base 63, if desired. In other words, the inward portion 70 may begin between a midpoint of the axial length of the retainer 62 (e.g. a midpoint between the base 63 and free end 66 in the illustrated example) and the second or free end 66 of the retainer 62, and may extend to and include the free end 66. The retainers 62 may be similarly constructed and arranged, may be axially aligned (that is, at the same axial distance from an axial end 50 of the boot can 44), and the inward portions 70 may extend to the same distance from the axis 20, with provision for normal part tolerances. In some implementations, the bend 72 is positioned with respect to the first location 63 at a ratio not less than 2.75 to 1. That is the linear portion of the retainer 62 between the first location 63 or base and the bend 72 is at least 2.75 times the length of the non-linear portion of the retainer 62 between the bend and the second location 65 or free end 66. That is, the bent section of the retainer 62 is shorter than the straight section of the retainer 62, with the straight section of the retainer being at least 2.75 times longer in length than the bent section in at least some implementations.

Figure 5:
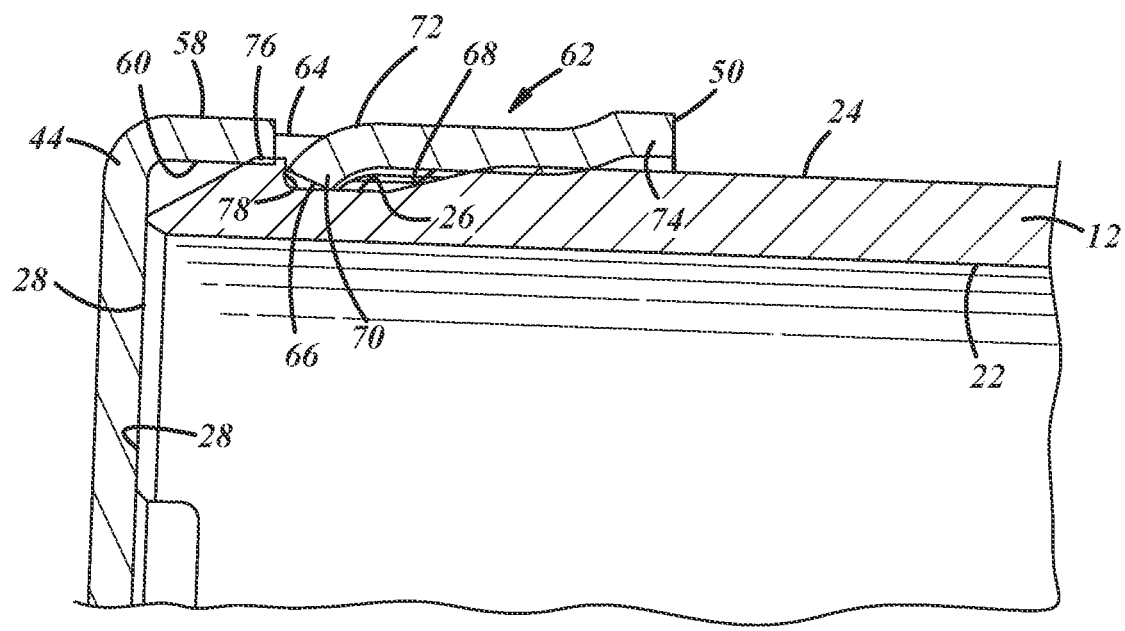
FIG. 5 is an enlarged partial sectional view showing a retainer of the boot can in a void of the outer race.
Figure 6:
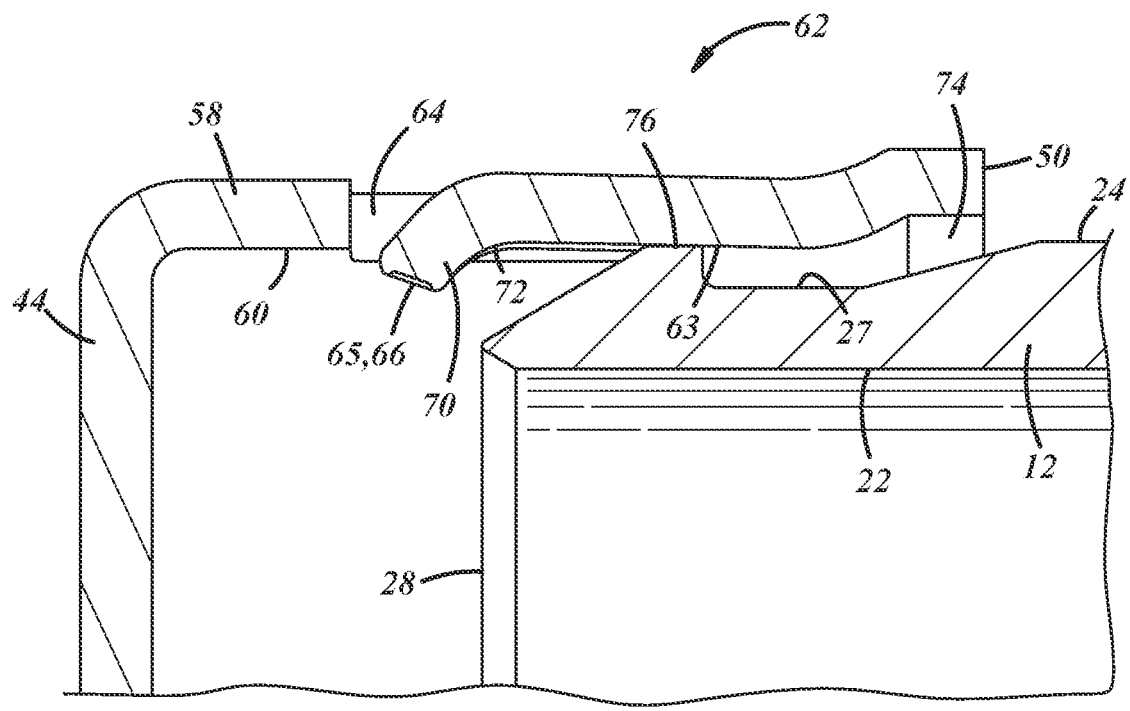
FIG. 6 is a sectional view similar to FIG. 5 showing the boot can prior to assembly on the outer race.
Figure 7:
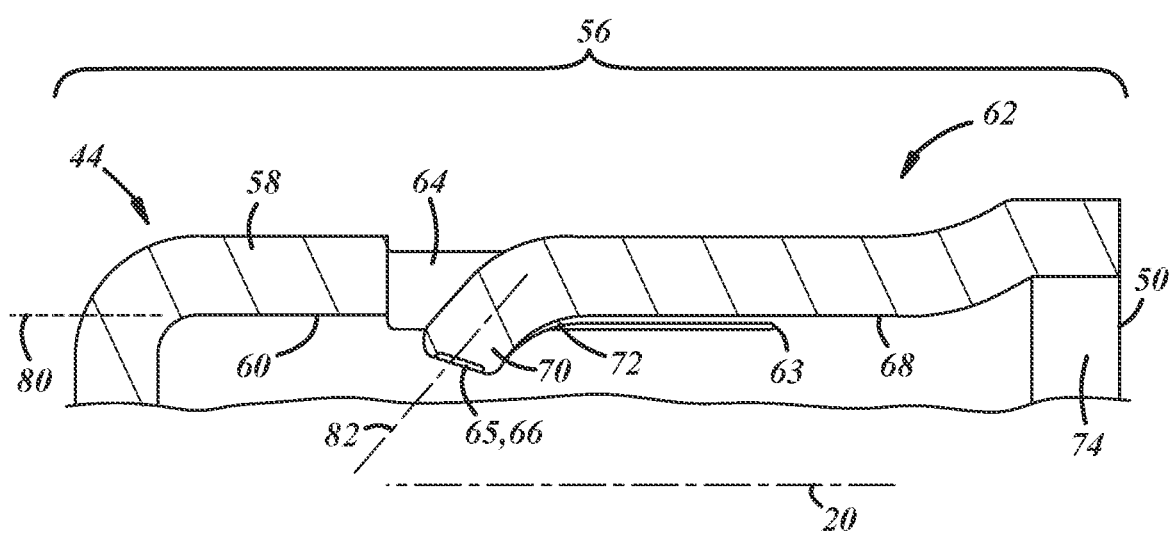
FIG. 7 is an enlarged sectional view of the boot can showing the retainer.

As shown in FIG. 7, prior to assembling the boot can 44 to the outer race 12, the retainers 62 are in an unflexed position or state. To assemble the boot can 44 to the outer race 12, the second axial end 50 of the boot can 44 is slid over the first axial end 28 of the outer race 12 in a first direction. To facilitate aligning the boot can 44 with the outer race 12 and initially sliding the boot can over the outer race, the second axial end 50 of the boot can 44 may include a radially outwardly flared lip 74 having an inner surface that is radially farther from the axis 20 than is the inner surface 68 of the retainer 62. Also or instead, the axial end 28 of the outer race 12 may be radially tapered (e.g. as shown in FIGS. 5-7) so that the axial end 28 has a smaller outer diameter than does a portion 76 (FIGS. 5 and 6) spaced from the axial end.

Figure 4:
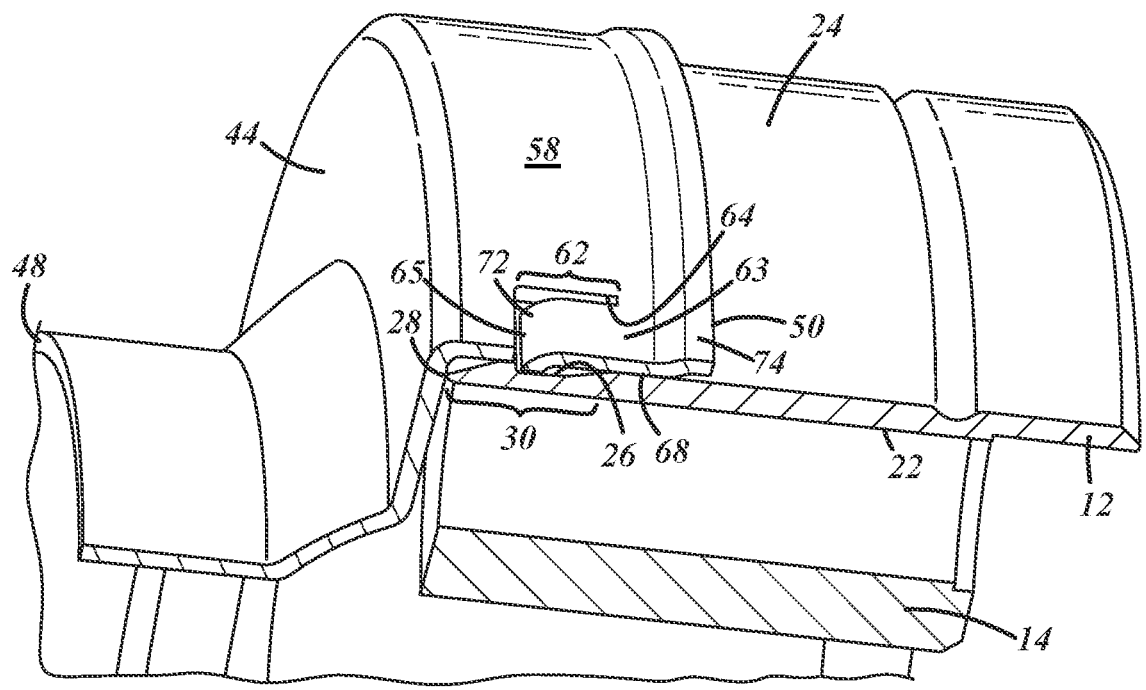
FIG. 4 is a partial sectional view of the boot can and an outer race of the CV joint to which the boot can is coupled.

As shown in FIG. 6, when the boot can 44 is slid onto the outer race 12, the base 63 of the retainers 62 are passed over the first axial end 28 of the outer race 12 before the inward portions 70. Until the inward portions 70 are passed over the outer race 12, in at least some implementations, the retainers 62 are minimally or not at all flexed by any engagement with the outer race. When the boot can 44 is slid onto the outer race 12 far enough, the inward portions 70 engage the outer race (e.g. at portion 76) and the retainers 62 are initially flexed outwardly (defining a flexed state of the retainers). The retainers 62 remain in the flexed state until the boot can 44 is slid onto the outer race 12 far enough that the inward portions 70 are aligned with the void 26. Then, the resilient retainers 62 return to or toward their unflexed state and the inward portion 70 is received within the void 26 as shown in FIGS. 2, 4 and 5, and may engage or be adjacent to the inner surface 27 of the void 26. In implementations with discrete, spaced apart voids 26, the retainers 62 may each be received in a void aligned with each respective retainer. In this position, the inward portions 70 of the retainer 62 are radially overlapped by the outer race 12 outboard of the void 26 to inhibit or prevent unintended removal of the boot can 44 from the outer race in a second direction opposite to the first direction. That is, forces tending to move the boot can 44 in the second direction are resisted by engagement of the retainers 62 with the outer race 12 from within the void 26.

The nonlinear retainers 62 permit better control over the point of engagement between the retainers and the outer race 12 during assembly of the boot can 44 to the outer race. In at least some implementations, the point of engagement of the outer race 12 with the retainers 62 is axially away from the base 63 of the retainers so that the force or stress of the engagement and flexing of the retainer is spread across a longer axial length of the retainer than if the retainer were to engage the outer race closer to the base of the retainer.

Spreading out the stress along a greater length of the retainer 62 reduces the maximum stress generated in the retainer and may limit or prevent plastic deformation of the retainer to ensure that the retainer can resiliently return to or toward the unflexed state when aligned with the void 26 in the assembled position of the boot can 44. Due to tolerances in the manufacture of the boot can 44 and the outer race 12, to ensure that the retainer(s) 62 engage(s) the outer race and may be received in the void 26 to retain the boot can on the outer race, a portion of the retainer(s), in at least some implementations are radially closer to the axis 20 than the outer surface 24 of the outer race 12 by up to and including 1.5 mm. With a retainer 62 that is arranged at a constant angle to the axis 20 along its axial length, and due to variances on the sizes of the boot can 44 and outer race 12 in production runs of these components, some of the retainers may be engaged by the outer race undesirably close to the base of the retainers which may cause plastic deformation of the retainers.

With the inward portion 70 of the retainers 62 described herein being arranged at a greater angle to the axis 20, the location of engagement can be controlled to be at or near the inward portion 70 and not near the base 63, to better distribute the bending/flexing stress along a greater length of the retainer. That is, the portion of the retainer 62 between the base 63 and a midpoint of the retainer 62 can be arranged to not engage the outer surface 24 of the outer race 12, or to minimally engage the outer surface 24 with the range of tolerances for the boot can 44 and outer race 12. Engagement of the retainers 62 with the outer race 12 can still be ensured by providing the inward portion 70 at a suitable distance from the axis 20 to ensure engagement of the inward portion with the outer race. Still further, in at least some implementations, the inward portions 70 include a convex outer surface portion due to the inward bend 72 of the retainer 62 to form the inward portion. The convex outer surface portion may be arranged to engage the outer race 12 within the void 26 (that is, engage a sidewall 78 of the void) as shown in FIG. 5, and such engagement may tend to bend the retainer inwardly, toward the axis 20. This inhibits unintended outward flexing of the retainer 62 which could tend to remove the inward portion 70 of the retainer from the void 26. In this way, forces tending to move the boot can 44 in the second direction may tend to flex the inward portions 70 further inwardly and thereby increase the retention of the boot can to the outer race 12.

In at least some implementations, the retainer 62 may be arranged relative to the flange 58 and outer race 12 so that, between the base 63 and a midpoint of the retainer between the base and free end 66, the retainer does not significantly engage the outer surface 24 of the outer race 12. In this example, significant engagement is an engagement that would cause flexing or bending of the retainer 62 by more than 10 degrees relative to the axis 20 of the boot can 44. Lower stress engagement may be permitted, that is, engagement that causes minimal flexing of the retainer 62 due to engagement between the base 63 and midpoint of the retainer with the outer race 12. In at least some implementations, the inner surface 68 of the retainer 62 between the first location or base 63 and the midpoint (represented by line 80 in FIG. 7) has an angle relative to the axis 20 that does not vary by more than ten degrees and this portion of the retainer 62 may have an inner surface at a distance from the axis 20 equal to or greater than the greatest radial distance of the outer surface 24 of the outer race 12 between the axial end 28 of the outer race and the void 26. In at least some implementations, the inner surface 68 of the retainer 62 form the midpoint to the first location 63 is parallel to the axis 20 or within five degrees of being parallel to the axis. In another embodiment, the inner surface 68 of the retainer 62 between the first location 63 and a midpoint between the first location 32 and second location 65 (e.g. between the base 63 and the free end 66) is not closer than 1 mm to the axis 20 than is a radially innermost portion of the inner surface 60 of the flange 58 outboard of a retainer 62. In another embodiment, the inward portion 70 of the retainer 62 may be defined in or otherwise include the free end 66 of the retainer 62. In yet another embodiment the retainer 62 from the bend 72 to the free end 66 (represented by line 82 through a midpoint of the retainer radial thickness) is arranged at an angle of at least twenty degrees relative to the axis 20, as shown in FIG. 7.

In some implementations, the retainers 62 also better maintain the compressive force on the seal 31 between the boot can 44 and the outer race 12 and may maintain direct contact between the boot can 44 and the first axial end 28 of the outer race 12. In at least some implementations, the axial distance between an inner surface of the intermediate portion 61 of the boot can 44 and free end 66 of the retainers 62 is less than the axial distance between: 1) an axially outward facing portion of the seal 31 that protrudes from the first axial end 28 of the outer race 12; and 2) the sidewall 78 of the void or groove 26 adjacent to the free end 66 of the retainer 62 in assembly. Thus, some compressive force may be maintained on the seal 31.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A boot assembly for a joint, comprising:
a boot made from a flexible material; and
a boot can having a body that includes:
a connecting portion at which the boot and boot can are coupled together,
a mounting portion including a flange having a central axis and an inner surface that faces the axis and extends circumferentially and axially relative to the axis, and
a retainer that is connected to the flange at a first location and is separate from the flange at a second location spaced from the first location so that at least a portion of the retainer is movable relative to the flange, the retainer has a length between the first location and second location and the retainer has an inner surface facing the axis, and wherein the retainer includes an inward portion spaced from the first location, and the inward portion is arranged closer to the axis than is the inner surface of the retainer between the first location and a midpoint of the length between the first location and the second location, and wherein the inner surface of the retainer is not at a constant angle relative to the axis along the length of the retainer, wherein the mounting portion includes a void that defines the second location of the retainer.

2. The assembly of claim 1 wherein the inner surface of the retainer, between the first location and a midpoint between the first location and second location, is not more than 1 mm closer to the axis than a radially innermost portion of the inner surface of the flange separate from the retainer.

3. The assembly of claim 1 wherein the inner surface of the retainer, between the first location and a midpoint between the first location and second location, is at an angle relative to the axis that does not vary by more than 10 degrees.

4. The assembly of claim 3 wherein the inner surface of the retainer from the midpoint to the first location is parallel to the axis or within 5 degrees of parallel to the axis.

5. The assembly of claim 3 wherein the inward portion is at an angle to the axis of at least 20 degrees.

6. The assembly of claim 1 wherein the inward portion includes a free end of the retainer that is not connected to and is movable relative to the flange, and the free end is bent relative to the remainder of the retainer at an angle of at least 20 degrees.

7. The assembly of claim 1 wherein the retainer is coupled to the flange at a base and has a free end that is not connected to and is movable relative to the flange and is spaced from the base, and wherein the free end is closer to the axis than is any other portion of the retainer.

8. A boot assembly, comprising:
a boot made from a flexible material; and
a boot can having:
a body with a connecting portion at which the boot and boot can are coupled together, and
a mounting portion with a central axis, the mounting portion includes a retainer that is connected to the boot can at a first location and is separate from the boot can at a second location spaced from the first location, and the mounting portion includes a void that defines the second location of the retainer, and the retainer is flexible and resilient so that at least a portion of the retainer is movable relative to the remainder of the boot can between an unflexed state and a flexed state, the retainer has a bend spaced from the first location that defines an inward portion of the retainer that, in the unflexed state of the retainer, is located radially closer to the axis than the remainder of the retainer.

9. The assembly of claim 8 wherein the retainer has an inner surface that, between the first location and a midpoint between the first location and second location, is not more than 1 mm closer to the axis than a radially innermost portion of the inner surface of the mounting portion other than the retainer.

10. The assembly of claim 8 wherein the retainer has an inner surface that, between the first location and a midpoint between the first location and second location, is at an angle relative to the axis that does not vary by more than 10 degrees.

11. The assembly of claim 10 wherein the inner surface of the retainer from the midpoint to the first location is parallel to the axis or within 5 degrees of parallel to the axis.

12. The assembly of claim 10 wherein the inward portion is at an angle to the axis of at least 20 degrees.

13. The assembly of claim 8 wherein the inward portion includes a free end of the retainer that is not connected to and is movable relative to the mounting portion, and the free end is bent relative to the remainder of the retainer at an angle of at least 20 degrees.

* * * * *